(12) United States Patent
Lee et al.

(10) Patent No.: US 8,895,199 B2
(45) Date of Patent: Nov. 25, 2014

(54) FUEL CELL SYSTEM USING HYDROGEN FROM ELECTROLYZER OF SEA WATER

(75) Inventors: Ju-Hyung Lee, Seoul (KR); Jong Won Choi, Incheon (KR); Suk-Won Cha, Seoul (KR); Ik Whang Chang, Daegu (KR)

(73) Assignee: XFC Inc., Seoul (KR)

( * ) Notice: Subject to any disclaimer, the term of this patent is extended or adjusted under 35 U.S.C. 154(b) by 507 days.

(21) Appl. No.: 13/253,511

(22) Filed: Oct. 5, 2011

(65) Prior Publication Data

US 2012/0100444 A1    Apr. 26, 2012

(30) Foreign Application Priority Data

Oct. 21, 2010 (KR) .................. 10-2010-0103061

(51) Int. Cl.
*H01M 8/04* (2006.01)
*H01M 8/06* (2006.01)
*C02F 103/08* (2006.01)
*H01M 16/00* (2006.01)
*C02F 1/461* (2006.01)
*H01M 8/10* (2006.01)

(52) U.S. Cl.
CPC ......... *H01M 8/0656* (2013.01); *C02F 2103/08* (2013.01); *H01M 8/04029* (2013.01); *Y02E 70/20* (2013.01); *H01M 16/00* (2013.01); *H01M 8/0662* (2013.01); *C02F 1/461* (2013.01); *C02F 2201/4618* (2013.01); *Y02E 60/50* (2013.01); *H01M 2008/1095* (2013.01)

USPC ........... 429/411; 429/410; 429/413; 429/414; 429/422; 429/435

(58) Field of Classification Search
None
See application file for complete search history.

(56) References Cited

U.S. PATENT DOCUMENTS

| | | | |
|---|---|---|---|
| 7,138,197 B2* | 11/2006 | Forte et al. ................. | 429/420 |
| 2005/0103643 A1* | 5/2005 | Shoup ......................... | 205/742 |
| 2007/0084728 A1* | 4/2007 | Martez ........................ | 204/627 |
| 2009/0011293 A1* | 1/2009 | Wood et al. ................ | 429/17 |
| 2010/0242453 A1* | 9/2010 | Johnston et al. ........... | 60/301 |
| 2012/0082284 A1* | 4/2012 | Hyde et al. ................. | 376/245 |

* cited by examiner

*Primary Examiner* — Jonathan Crepeau
(74) *Attorney, Agent, or Firm* — Alston & Bird LLP

(57) ABSTRACT

Provided is a fuel cell system using waste hydrogen generated from a sea water electrolyzing apparatus, the fuel cell system including: a sea water electrolyzing apparatus carrying out electrolysis of sea water used as cooling water in a nuclear power generation system to produce a chlorine-containing material; a hydrogen conveying line linked to one side of the sea water electrolyzing apparatus to convey waste hydrogen generated during the electrolysis; and a fuel cell linked to the hydrogen conveying line to generate electricity by using the waste hydrogen supplied from the hydrogen conveying line as fuel. The fuel cell system generates electricity by using waste hydrogen, which, otherwise, is totally discarded after being generated secondarily from the sea water electrolyzing apparatus, as fuel for the fuel cell.

5 Claims, 8 Drawing Sheets

FUEL CELL SYSTEM USING HYDROGEN FROM ELECTROLYZER OF SEA WATER

CROSS-REFERENCE TO RELATED APPLICATIONS

This application claims priority under 35 U.S.C. §119 to Korean Patent Application No. 10-2010-0103061, filed on Oct. 21, 2010, in the Korean Intellectual Property Office, the disclosure of which is incorporated herein by reference in its entirety.

TECHNICAL FIELD

The following disclosure relates to a fuel cell system using waste hydrogen generated from a sea water electrolyzing apparatus. More particularly, the following disclosure relates to a fuel cell system generating electricity by using waste hydrogen as fuel, wherein the waste hydrogen is generated secondarily from a sea water electrolyzing apparatus generating a chlorine-containing material through the electrolysis of sea water used as cooling water for a nuclear power plant.

BACKGROUND

In general, as shown in FIG. 1, a nuclear power generation system 1 includes a reactor 2 in which a nuclear reaction occurs, a heat exchange unit 3 carrying out cooling and heat exchange of the reactor, a power generator 7 generating electricity by using steam produced from the heat exchange unit, and a cooling unit 8 for cooling the steam. Such a nuclear power generation system further includes a steam generator 4 for generating steam.

In the nuclear power generation system, cooling water is introduced from the sea for cooling hot water passed from a turbine or cooling a heat exchanger, and waste cooling water is discharged to the sea through the outlet of the system. In general, when the cooling water introduced to the nuclear power generation system at room temperature is subjected to heat exchange for the purpose of cooling, the cooling water is heated to about 90° C. The waste cooling water is additionally cooled through a cooling system before it is discharged, so that the temperature of the discharged cooling water may not be higher than the surrounding sea water by a predetermined temperature (approximately 7° C.).

In order to provide a great amount of cooling water used for such a nuclear power generation system, sea water is used conventionally as the cooling water. In a cooling water intake apparatus having a sea water path linked thereto, adhesive marine organisms, including fish and shellfish, such as mussel and clam live and grow. Such marine organisms are introduced to the cooling water intake apparatus through the sea water path providing ideal environmental conditions of a warm temperature and low flow rate. The marine organisms introduced to the cooling water intake apparatus as described above adhere to the inner wall of the sea water path and various parts of the cooling water intake apparatus and live and grow therein, resulting in corrosion and damage of such parts. Sometimes, depending on the degree of adhesion and growth, such marine organisms partially or totally block the sea water path or the cooling water intake apparatus, resulting in serious problems, including degradation of the efficiency of a cooling water pump or failure thereof, a drop in amount of sea water introduction caused thereby, as well as corrosion or maloperation of related parts, such as a condenser or heat exchanger.

To solve the above-mentioned problems, a sea water electrolyzing apparatus 10 is installed in a nuclear power generation system as shown in FIG. 2. The sea water electrolyzing apparatus 10 carries out electrolysis of sodium chloride (NaCl) in sea water to produce sodium hypochlorite (NaOCl, also referred to as a chlorine-containing material herein), which, in turn, is injected to the water intake port to perform sterilization, thereby preventing adhesion and growth of shellfish, seaweeds, etc. to the pipelines and tubes of the heat exchanger.

Referring to FIG. 2 illustrating the sea water electrolyzing apparatus 10, a DC power source converted through a rectifier 11 is connected to each of an anode plate 12a and a cathode plate 12b. Sea water passes through the sea water electrolyzing apparatus 10, and then NaCl in sea water reacts with $H_2O$ to produce a chlorine-containing material. In other words, NaCl in sea water and $H_2O$ are electrolyzed by the DC current supplied through the rectifier to produce ions (Na, Cl, H, OH). Among such ions, Cl moves to the anode to generate chlorine gas ($Cl_2$), while H moves to the cathode to generate hydrogen gas ($H_2$). Na having higher reactivity than Cl presents in its ionic state and forms a bond with OH to produce NaOH, which, in turn, reacts with chlorine gas ($Cl_2$) to produce a chlorine-containing material (NaOCl). Since the degree of electrolysis depends on the magnitude of the DC current supplied to the apparatus, it is possible to control the concentration of sodium hypochlorite.

The chlorine-containing material and hydrogen generated secondarily from the sea water electrolyzing apparatus are transferred to a storage tank 13 via a solenoid valve. The hydrogen gas at the top of the storage tank is discharged into the air through a blower 14. In other words, currently, in the sea water electrolyzing apparatus, waste hydrogen generated secondarily from the apparatus is merely emitted to the air without recycling.

Meanwhile, upon the operation of a fuel cell, catalyst oxidation or degradation of physical properties of a Nafion membrane may occur at the anode (electrode to which hydrogen is supplied) in the fuel cell due to gases or ions other than hydrogen, such as oxygen, carbon monoxide, chlorine, etc. To solve the above-mentioned problems, there has been an attempt to use a binary or ternary catalyst as a catalyst for a fuel cell. For example, a Pt—Ru electrode has been used in direct methanol fuel cells (DMFCs). However, such an attempt is not totally successful. Particularly, the problem related to degradation of physical properties of a Nafion membrane still remains unsolved.

SUMMARY

An embodiment of the present invention is directed to providing a fuel cell system using waste hydrogen generated from a sea water electrolyzing apparatus, the fuel cell system being capable of generating electricity by reutilizing waste hydrogen, which, otherwise, is discarded after being generated secondarily from the sea water electrolyzing apparatus.

In one general aspect, there is provided a fuel cell system using waste hydrogen generated from a sea water electrolyzing apparatus, the fuel cell system including: a sea water electrolyzing apparatus carrying out electrolysis of sea water used as cooling water in a nuclear power generation system to produce a chlorine-containing material; a hydrogen conveying line linked to one side of the sea water electrolyzing apparatus to convey waste hydrogen generated during the electrolysis; and a fuel cell linked to the hydrogen conveying line to generate electricity by using the waste hydrogen supplied from the hydrogen conveying line as fuel.

In one embodiment, the fuel cell system may include a waste hydrogen deionization or dechlorination unit. The waste hydrogen deionization or dechlorination unit may be a coaxial channel having a core channel, a shell channel surrounding the core channel, and an intermediate membrane defining the core channel and the shell channel. The waste hydrogen flows through the core channel, while water discharged from the fuel cell flows through the shell channel.

Particularly, the intermediate membrane may be wetted with water and has physicochemical properties sufficient for the operation of the fuel cell system, such as mechanical strength sufficient to resist against tearing during the operation. Materials for the intermediate membrane satisfying the above requirements are known to those skilled in the art on the basis of the present disclosure. The ions and chlorine contained in the gases flowing through the core channel after being discharged from the sea water electrolysis tank may be collected at the wet intermediate membrane.

In another embodiment, the fuel cell system using waste hydrogen generated from a sea water electrolyzing apparatus may further include a bubbler for deionization or dechlorination of waste hydrogen. The bubbler may allow the gas passed from the coaxial channel to be bubbled in deionized water, while the gas is collected over the deionized water to be sent to the hydrogen inlet of the fuel cell. In addition, the deionized water may be exchanged periodically with fresh deionized water.

In still another embodiment, the fuel cell system using waste hydrogen generated from a sea water electrolyzing apparatus may further include a scrubber for deionization or dechlorination of waste water. The scrubber may include activated carbon or iron oxide ($FeO_2$) and the gas collected over the deionized water is passed through the scrubber to be sent to the hydrogen inlet of the fuel cell.

In still another embodiment, the fuel cell may be a polymer electrolyte membrane fuel cell (PEMFC). The sea water electrolyzing apparatus may be connected electrically to the fuel cell so that the sea water electrolyzing apparatus may be operated by the electricity generated from the fuel cell. The hydrogen conveying line may be provided with a hydrogen reservoir in which waste hydrogen is stored.

In still another embodiment, the fuel cell system using waste hydrogen generated from a sea water electrolyzing apparatus may further include a DC/AC converter converting DC voltage generated from the fuel cell into AC voltage. The fuel cell system may further include a heat exchanger carrying out heat exchange between the first cooling water discharged from the nuclear power generation system and the second cooling water introduced into the fuel cell.

In yet another embodiment, the fuel cell system using waste hydrogen generated from a sea water electrolyzing apparatus may further include a heating unit using the second cooling water discharged from the fuel cell as a heating source. The heating unit may be linked to the heat exchanger via a cooling water circulation line so that the second cooling water may be circulated through the fuel cell, the heating unit and the heat exchanger.

Other features and aspects will be apparent from the following detailed description and the claims.

BRIEF DESCRIPTION OF THE DRAWINGS

The above and other aspects, features and advantages of the disclosed exemplary embodiments will be more apparent from the following detailed description taken in conjunction with the accompanying drawings in which.

DETAILED DESCRIPTION OF EMBODIMENTS

Figure 1:
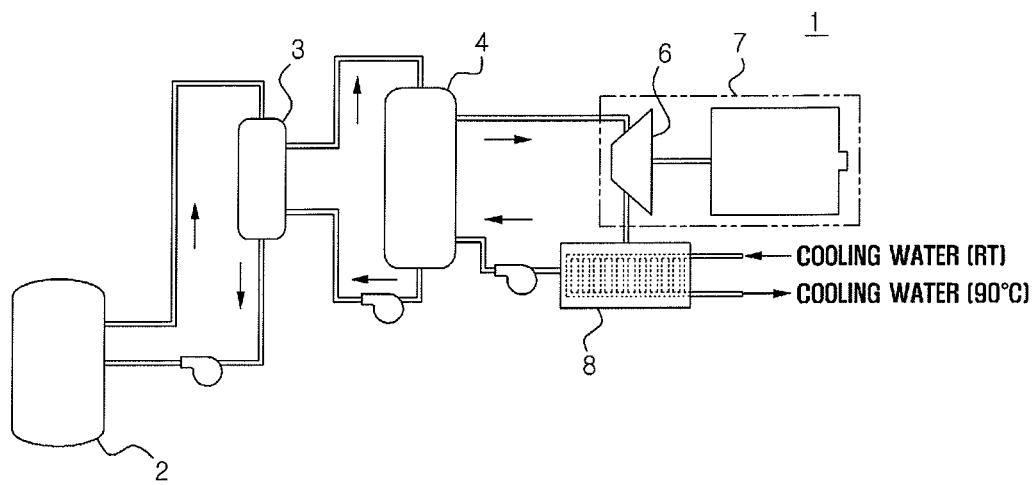
FIG. 1 is a schematic view showing a general nuclear power generation system.
Figure 2:
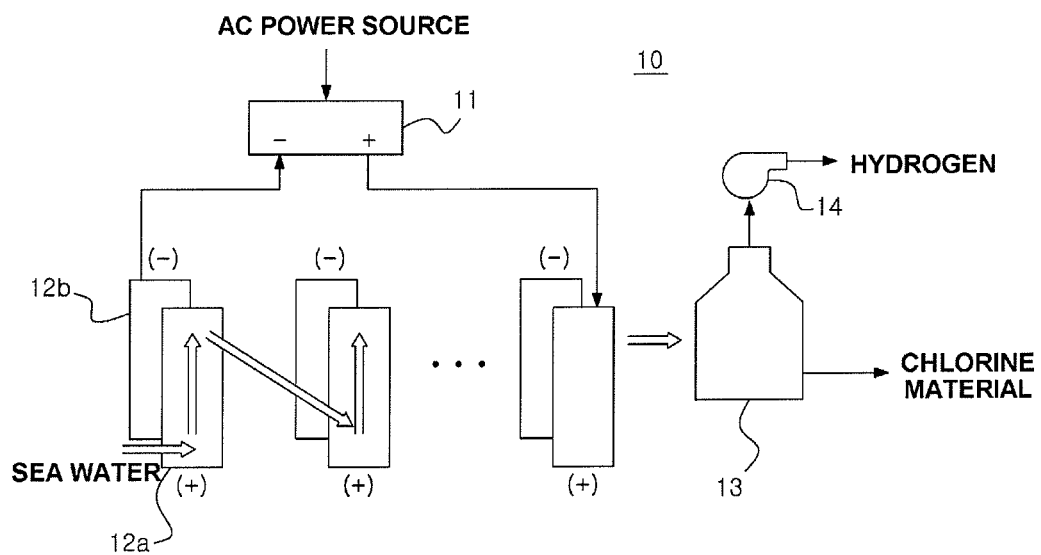
FIG. 2 is a schematic view showing a general sea water electrolyzing apparatus.

The advantages, features and aspects of the present invention will become apparent from the following description of the embodiments with reference to the accompanying drawings, which is set forth hereinafter. The present invention may, however, be embodied in different forms and should not be construed as limited to the embodiments set forth herein. Rather, these embodiments are provided so that this disclosure will be thorough and complete, and will fully convey the scope of the present invention to those skilled in the art. The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

A fuel cell is a device converting chemical energy generated by oxidation directly into electric energy and is based on eco-friendly future-oriented technology generating electric energy from materials, such as hydrogen and oxygen, abundant on the earth.

A fuel cell performs an electrochemical reaction in the reverse manner to hydrolysis of water by supplying oxygen to a cathode and hydrogen to an anode. As a result of the reaction, electricity, heat and water are generated while not causing any pollution. In this manner, it is possible to produce electric energy with high efficiency.

Since such a fuel cell is free from limitations of the Carnot Cycle serving as restriction in conventional heat engines, it realizes an efficiency of at least 40%. In addition, it only emits water, thereby causing no pollution. Contrary to conventional heat engines, such a fuel cell requires no part moving mechanically, so that it may be downsized and may not generate any noise. Therefore, active researches and studies have been conducted about such fuel cells.

A fuel cell system generally includes a fuel cell stack generating electric energy, a fuel supply unit supplying fuel (hydrogen) to the fuel cell stack, an air supply unit supplying oxygen in air to the fuel cell stack as an oxidant required for electrochemical reaction, and a heat and water control unit removing the reaction heat of the fuel cell stack to the exterior and controlling the operation temperature of the fuel cell stack.

Based on such constitution of a fuel cell system, electricity is generated by electrochemical reaction between hydrogen as fuel and oxygen in air while heat and water are discharged as byproducts.

Depending on the particular type of electrolyte used in fuel cells, the following six types of fuel cells have been commercialized or developed: phosphoric acid fuel cells (PAFCs), molten carbonate fuel cells (MCFCs), solid oxide fuel cells (SOFCs), polymer electrolyte membrane fuel cells (PEM-FCs), direct methanol fuel cells (DMFCs), and alkaline fuel cells (AFCs).

Among such fuel cells, PEMFCs having high output density are widely used, particularly in cars.

Figure 3:
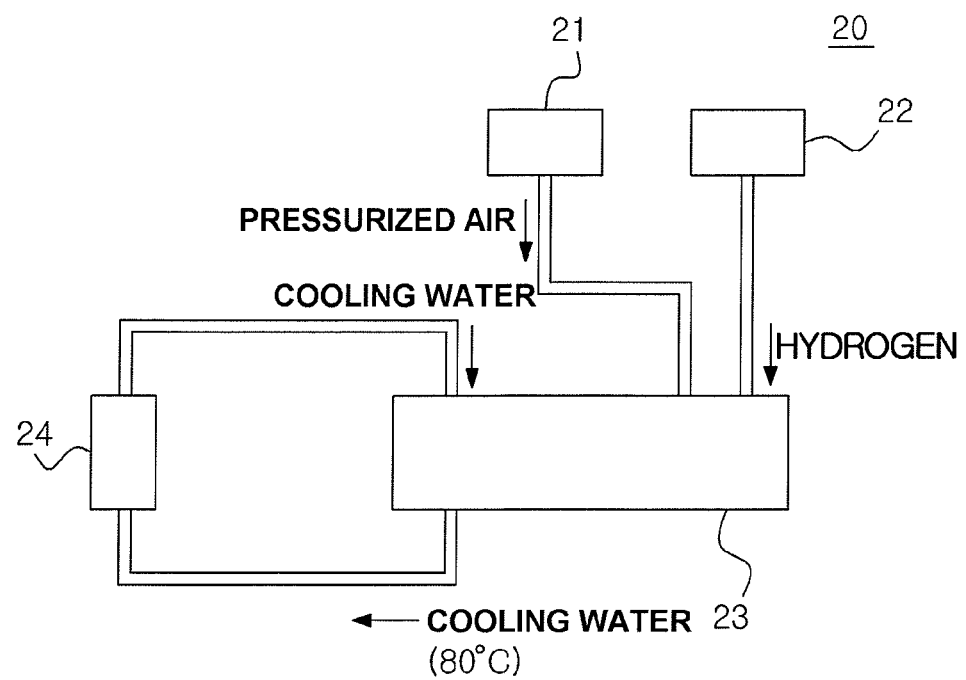
FIG. 3 is a diagram showing a PEMFC.

FIG. 3 is a diagram showing a PEMFC system used in a car. In the PEMFC system, hydrogen is supplied from a hydrogen tank 22 to a fuel cell 23, and pressurized air is supplied to the fuel cell 23 through a pressurizer 21. In order to cool the heat generated by the electrochemical reaction between hydrogen and air, cooling water passing through a radiator 24 cools the fuel cell.

The present disclosure is based on generating electricity from a fuel cell system by using waste hydrogen generated secondarily from a sea water electrolyzing apparatus as fuel for the fuel cell system.

According to an embodiment, the fuel cell system 100 using waste hydrogen includes: a sea water electrolyzing apparatus 30 carrying out electrolysis of sea water used as cooling water in a nuclear power generation system to produce a chlorine-containing material; a hydrogen conveying line 31 linked to one side of the sea water electrolyzing apparatus to convey waste hydrogen generated during the electrolysis; and a fuel cell 40 linked to the hydrogen conveying line to generate electricity by using the waste hydrogen supplied from the hydrogen conveying line as fuel.

Figure 4:
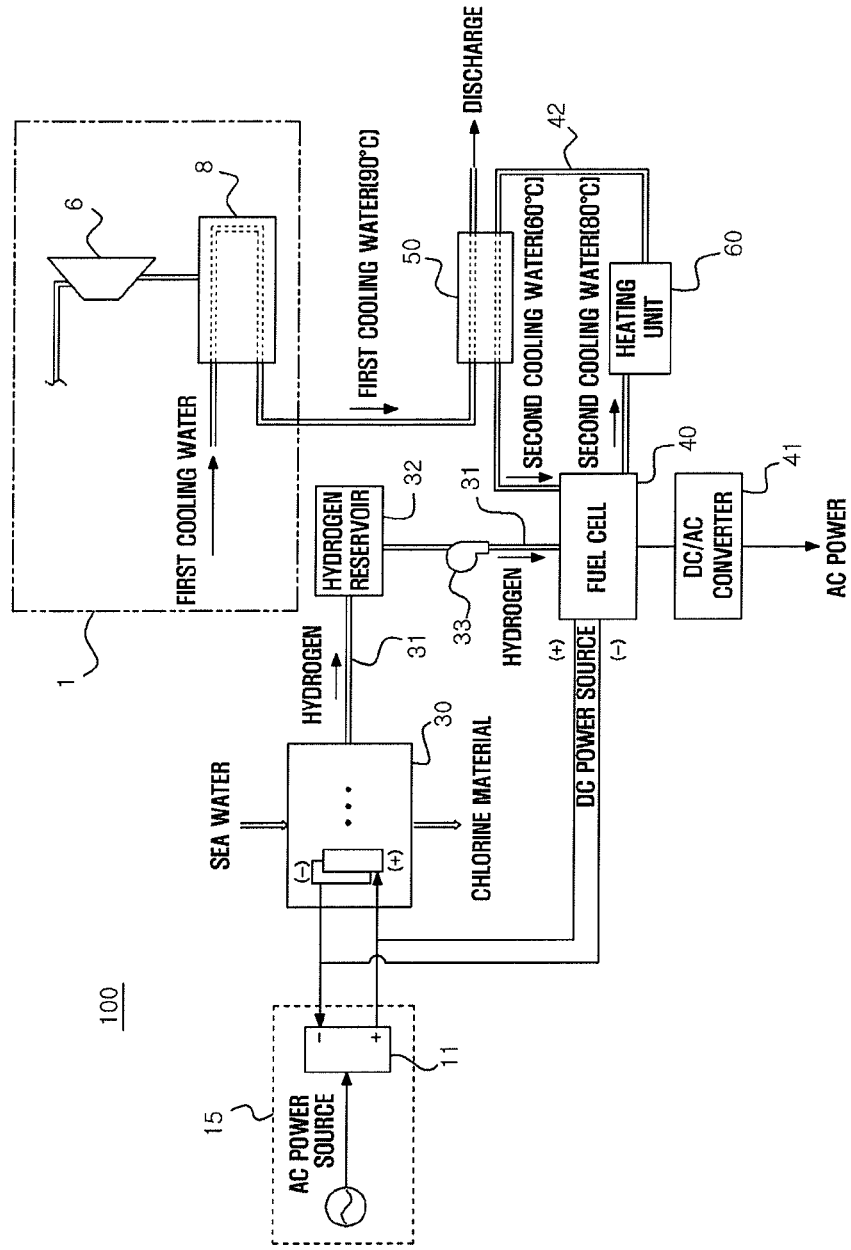
FIG. 4 is a schematic view showing a fuel cell system using waste hydrogen generated from a sea water electrolyzing apparatus in accordance with an embodiment.

FIG. 4 is a schematic view of the fuel cell system 100 using waste hydrogen generated from a sea water electrolyzing apparatus in accordance with an embodiment.

Particularly, hydrogen generated through the electrolysis of sea water at the sea water electrolyzing apparatus 30 is conveyed to the fuel cell 40 via the hydrogen conveying line 31. The hydrogen conveying line may be provided with a hydrogen reservoir 32 to store hydrogen. The hydrogen conveying line may be further, provided with a hydrogen feed pump 33 to facilitate hydrogen supply to the fuel cell 40.

The fuel cell 40 includes a plurality of unit cells stacked successively, and each unit cell includes an electrolyte membrane, a cathode and an anode stacked on each side of the electrolyte membrane interposed therebetween, and separators stacked on the external sides of the cathode and the anode to allow hydrogen and air to be circulated while being in contact with the cathode and the anode. A current collector is stacked on the external side of each separator to form a current collecting electrode. Detailed description about the internal structure of a fuel cell is well known to those skilled in the art and thus will be omitted herein.

The fuel cell operates as follows.

A predetermined amount of hydrogen is pumped from the hydrogen reservoir 31 by the hydrogen feed pump 33, and then is supplied to the anode in the fuel cell 40. In addition, air is supplied to the fuel cell so that the hydrogen supplied to the anode and air are subjected to oxidation and reduction, thereby generating electric energy.

The electric energy generated in this manner is in the form of DC voltage, and thus may be used directly as a power source of the sea water electrolyzing apparatus with no need for a separate rectifier. In other words, a portion of the electric power may be used to drive the sea water electrolyzing apparatus by supplying the DC voltage generated from the fuel cell to the electrode plates of the sea water electrolyzing apparatus.

When applying the DC voltage generated from the fuel cell directly to the sea water electrolyzing apparatus, electricity is generated from waste hydrogen and a need for a separate rectifier is avoided. As a result, it is possible to reduce consumption of energy corresponding to the efficiency (about 50%) of a rectifier. Accordingly, the fuel cell may substitute for a power supply unit 15 serving as a power source for the conventional sea water electrolyzing apparatus.

In addition, the electric energy generated from the fuel cell 40 may be converted into AC voltage required for household applications through a DC/AC converter 41, so that it may contribute to electric power sales.

Meanwhile, the heat generated in the fuel cell is removed by using cooling water. In the case of a PEMFC, a recommended operating temperature is about 60-80° C. Thus, the cooling water introduced to the fuel cell to improve the fuel cell reactivity and to perform preheating may have a temperature of about 60° C. Herein, deionized water may be used as the cooling water for the fuel cell.

To increase the temperature of the cooling water (the second cooling water) supplied to the fuel cell to about 60° C., waste heat of the cooling water (the first cooling water) discharged from the nuclear power generation system 1 may be used.

In other words, the fuel cell system according to an embodiment may further include a heat exchanger 50 carrying out heat exchange between the first cooling water discharged from the nuclear power generation system 1 and the second cooling water introduced to the fuel cell.

The first cooling water subjected to cooling from the nuclear power generation system has a temperature of about 90° C. According to the related art, the cooling water is further cooled by using an additional cooling system before it is discharged to the surrounding sea water. However, according to an embodiment of the present disclosure, waste heat of the first cooling water may be used to heat the second cooling water introduced to the fuel cell. In other words, the fuel cell system disclosed herein is provided with a heat exchanger 50 carrying out heat exchange between the first cooling water and the second cooling water. As a result, it is possible to recycle the waste heat, which, otherwise is discarded from a conventional nuclear power generation system, to drive the fuel cell.

According to an embodiment, the fuel cell system may further include a heating unit 60 using the cooling water discharged from the fuel cell as a heating source. Since the second cooling water discharged from the fuel cell has a temperature of about 80° C., it may be supplied to a heating unit through a cooling water circulation line 42. In this manner, it is possible to recycle the waste heat of the fuel cell. In addition, the cooling water circulation line 42 may be disposed in such a manner that the second cooling water passes through the heat exchanger 50, the fuel cell 40 and the heating unit 60.

Therefore, the waste heat of the second cooling water discharged from the fuel cell is reutilized in the heating unit, and the second cooling water having a reduced temperature through the heating unit is heat exchanged again with the first cooling water in the heat exchanger 50 and is heated to about 60° C. Then, the second cooling water is introduced back to the fuel cell to cool the fuel cell.

As described above, the fuel cell system 100 disclosed herein generates electricity by using waste hydrogen generated from a sea water electrolyzing apparatus as fuel, and preheats and cools the fuel cell by using the waste heat discarded from the nuclear power generation system. In addition, the waste heat generated after cooling the fuel cell is used again for a heating unit. In this manner, it is possible to realize highly efficient recycling of waste heat of a nuclear power generation system and a fuel cell system, as well as waste hydrogen of a sea water electrolyzing apparatus.

The amount of electric energy that may be generated from the fuel cell system according to an embodiment may be calculated as follows.

In general, 1,100 ppm of a chlorine-containing material is produced during electrolysis per module of sea water electrolyzer. The amount of a chlorine-containing material may be expressed in terms of mol/hr according to the following formula:

NaOCl: 1,100 ppm (mg/l)*30 ton/hr=(33 kg/hr,$Cl_2$)/(1 mol/35 g)=1,155 mol/hr

Meanwhile, hydrogen is produced in the same molar amount as the chlorine-containing material. Thus, the amount of hydrogen generated during electrolysis per module of sea water electrolyzer is obtained as follows.

$H_2$: 1,155 mol/hr*22.4 l/1 M=26 $m^3$/hr

In the case of a PEMFC, approximately 1 kW of electricity may be generated by using 1 $m^3$/hr of hydrogen. Therefore, it is possible to generate electricity in an amount of about 26 kW/hr per module of sea water electrolyzer.

In general, 10-20 sea water electrolyzing modules are provided in a nuclear power plant. Thus, electric energy that may be obtained by using waste hydrogen is calculated by multiplying the number of modules.

Figure 5:
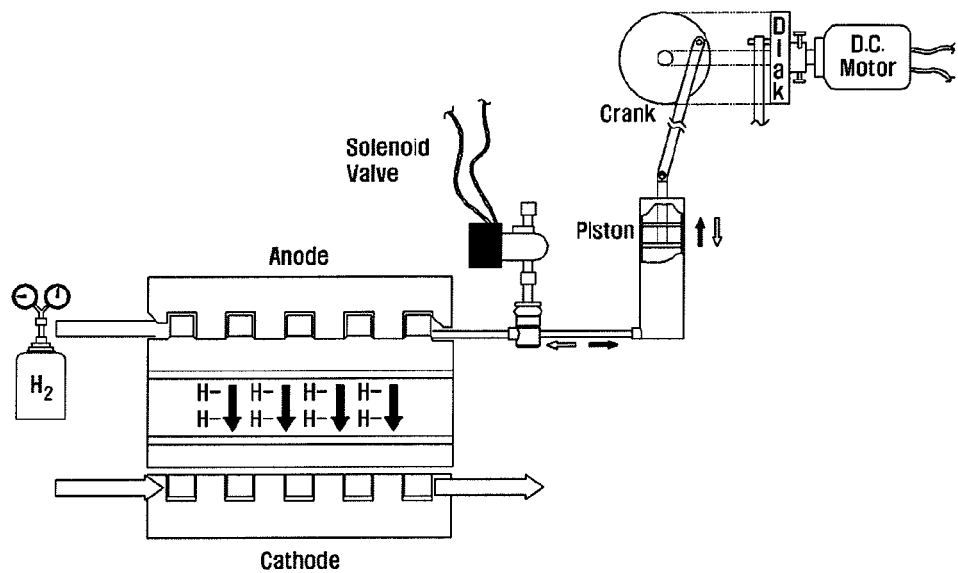
FIG. 5 is a schematic view showing a pulse generator according to an embodiment.

According to an embodiment, the fuel cell may be operated under a closed mode while applying pulses to the rear end of the fuel cell. Such an embodiment may be realized as shown in FIG. 5.

Figure 6:
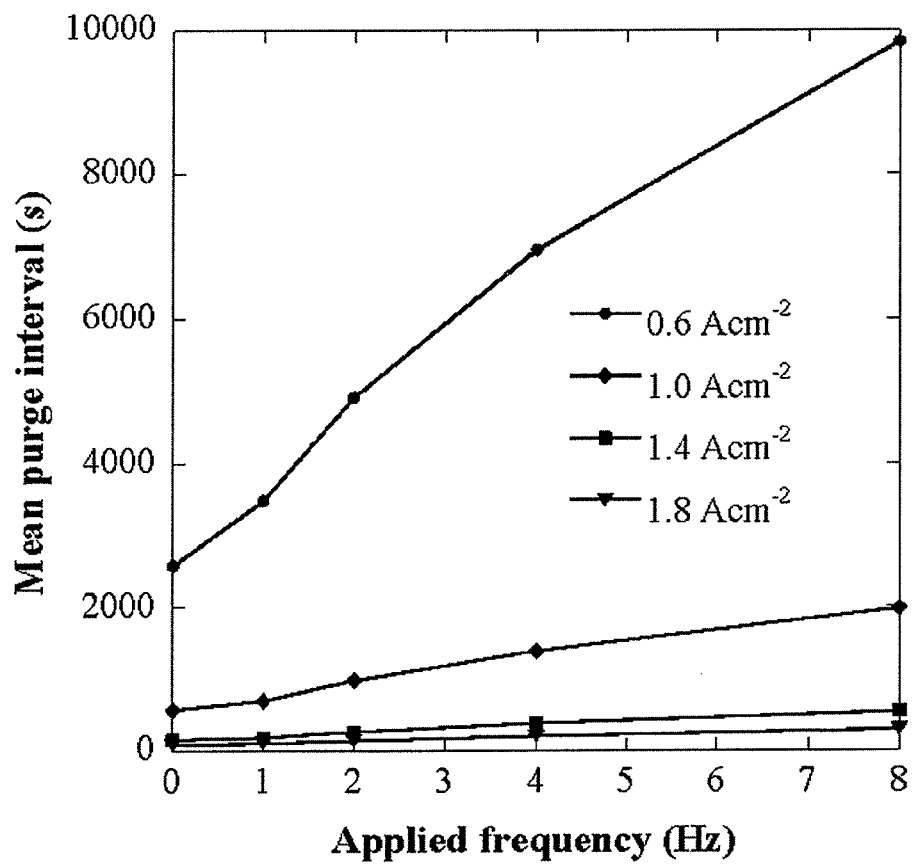
FIG. 6 is a graph showing a mean purge interval when applying pulses.

It can be seen from FIG. 6 that the mean purge integral (period during which a predetermined voltage is maintained without purging) is significantly improved as the frequency of pulses increases.

According to another embodiment, the fuel cell may use dry hydrogen or dehumidified hydrogen as fuel. In this case, the fuel cell may be further provide with a hydrogen drying unit at the upstream of the hydrogen inlet for drying hydrogen introduced to the fuel cell.

Figure 7:
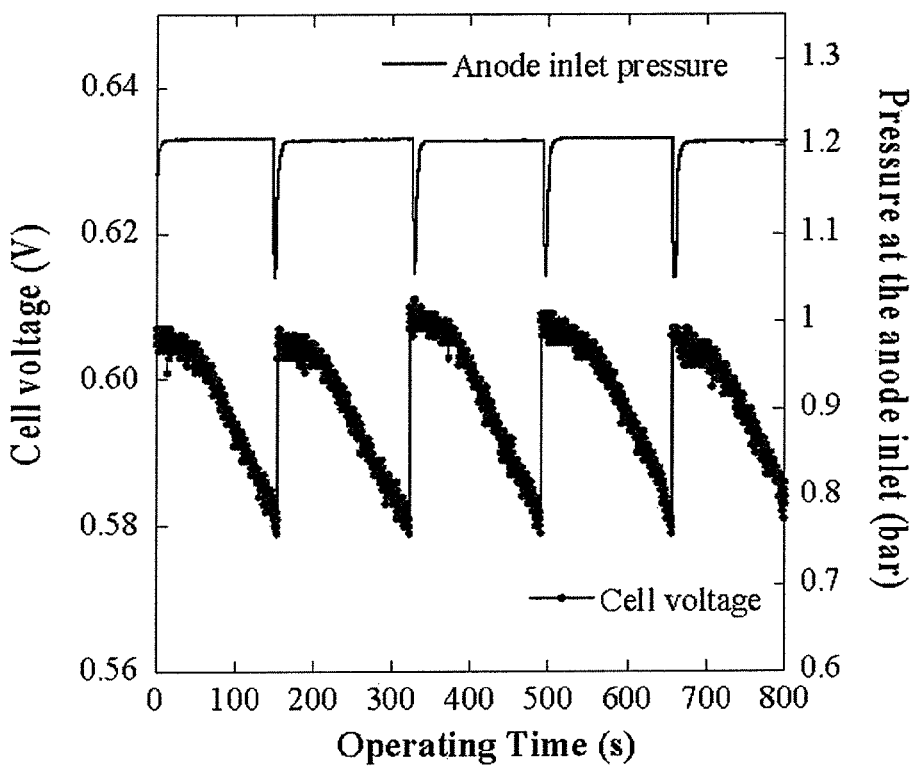
FIG. 7 and FIG. 8 are graphs showing variations in voltage when using no dry hydrogen or when using dry hydrogen, respectively.
Figure 8:
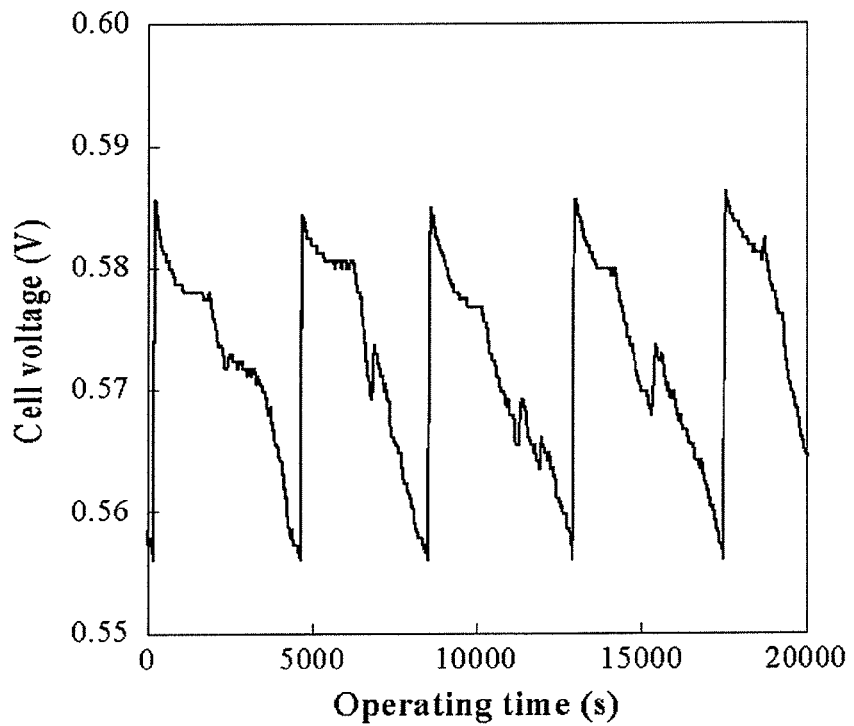

As shown in FIG. 7 and FIG. 8, use of dry hydrogen results in an increase in the mean purge interval from 120-130 seconds (using no dry hydrogen) to about 5,000 seconds (using dry hydrogen).

Figure 9:
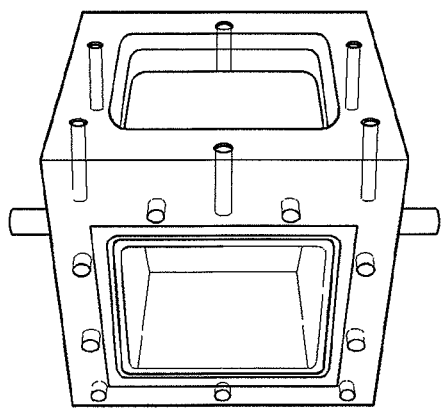
FIG. 9 is a photograph showing a chamber provided with a selective water permeable membrane.

According to still another embodiment, the fuel cell may further include a chamber provided with a selective water permeable membrane at the rear end thereof. Particular examples of the membrane include a Nafion membrane available from DuPont Co., but are not limited thereto. An exemplary embodiment of the chamber is shown in FIG. 9. The membrane may be applied to at least one side except the left side and the right side.

Figure 10:
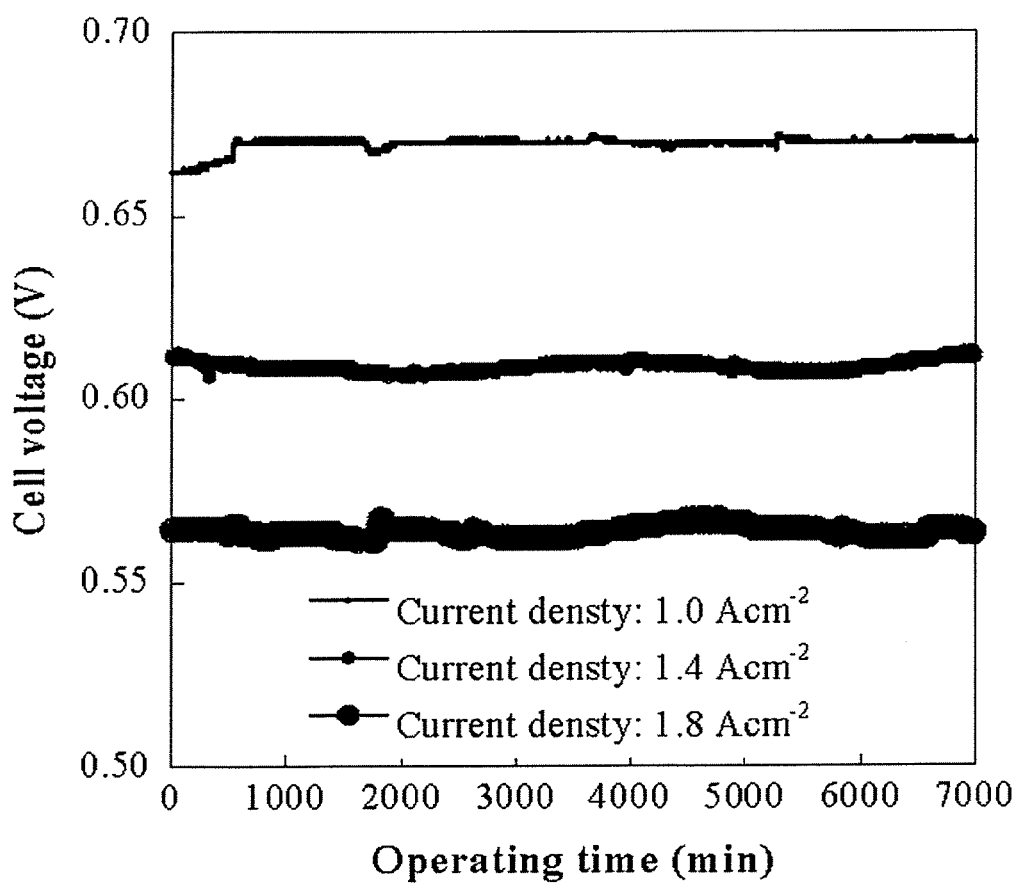
FIG. 10 is a graph showing variations in voltage when using the chamber as shown in FIG. 9.
Figure 11:
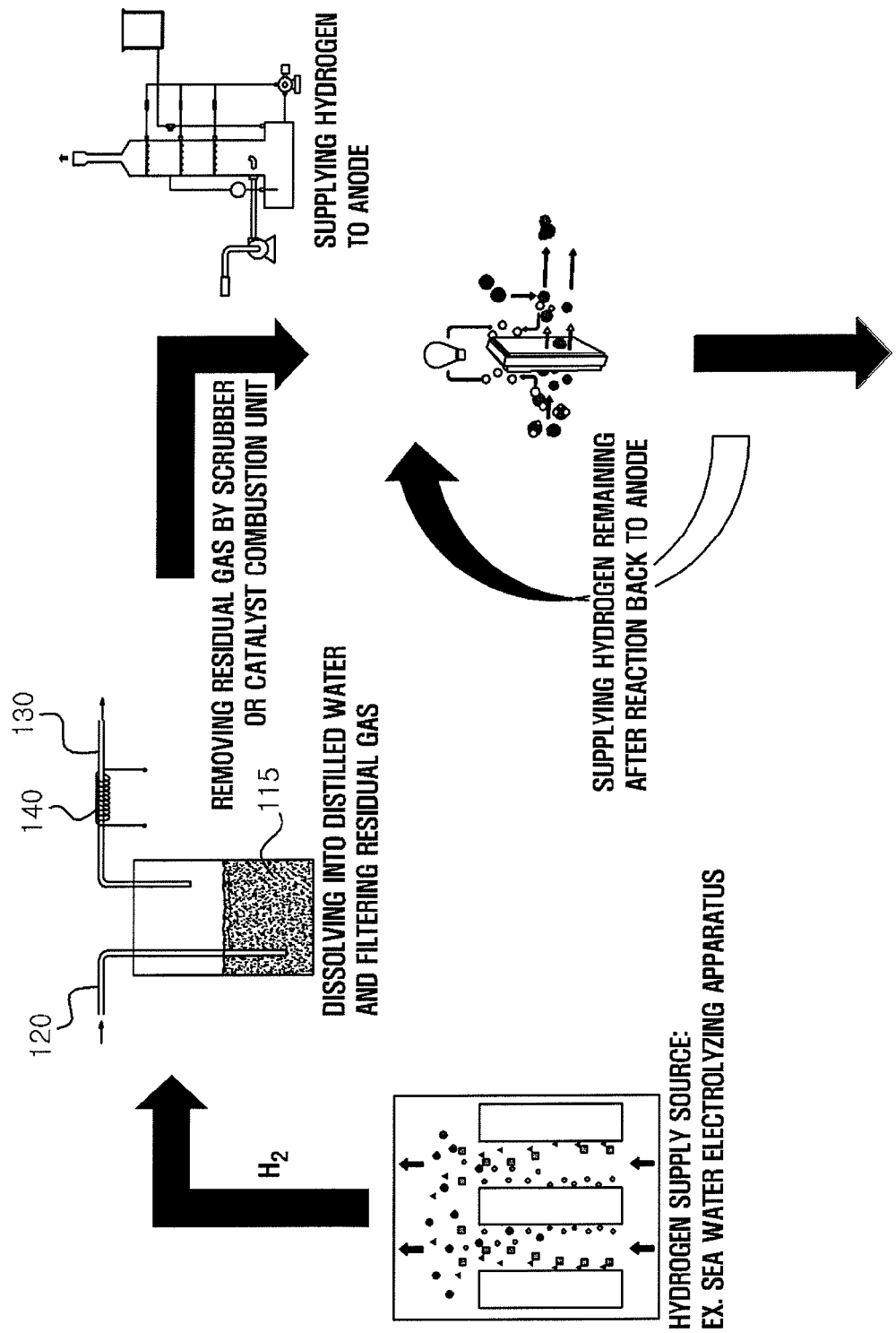
FIG. 11 is a schematic view showing a bubbler and a scrubber according to an embodiment.
Figure 12:
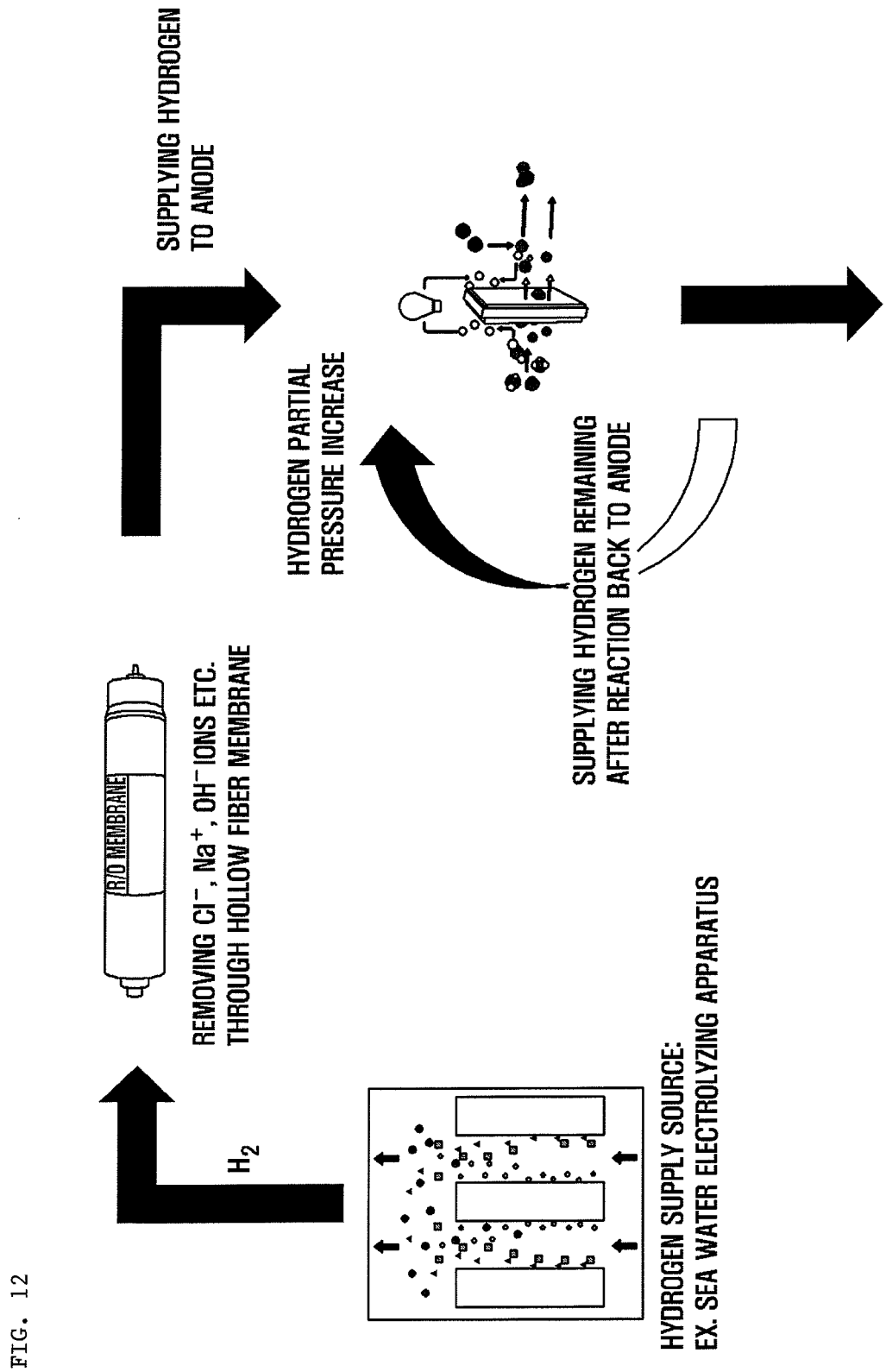
FIG. 12 is a schematic view showing a coaxial channel according to an embodiment.

As can be seen from FIG. 10, the chamber provides a mean purge interval of up to 5 days.

According to yet another embodiment, the fuel cell may include a plurality of stack modules, and the operation of each stack module may be controlled independently from each other. In this manner, it is possible to improve the efficiency in repairing and maintaining the fuel cell.

In a particular embodiment, the same amount of hydrogen is supplied to the fuel cell having hydrogen supply lines both at the front end and the rear end thereof through the front end and the rear end.

In this embodiment, the fuel cell is operated in a closed mode, and may be operated under the application of pulses to either the front end or the rear end, or to both the front end and the rear end. In the latter case, the application of pulses to both ends may be realized in such a manner that the front end is pushed while the rear end is pulled or vice versa).

In addition, in another particular embodiment, the fuel cell is operated in a closed mode and electronic regulators may be further provided at both the front end and the rear end to control the hydrogen pressure. In this embodiment, the electronic regulators serve to cause a difference in hydrogen pressure between the front end and the rear end, when the voltage drops to a predetermined level due to water produced in the fuel cell after being maintained constantly at the front end and the rear end.

In the above two embodiments, the application of pulses results in an overall improvement in effects corresponding to 15% and 20%, respectively, as compared to the embodiments having experimental data.

As can be seen from the foregoing, according to the fuel cell system disclosed herein, it is possible to generate electricity by using waste hydrogen, which, otherwise is totally discarded from a sea water electrolyzing apparatus, as fuel. A portion of DC power generated from the fuel cell may be used in a sea water electrolyzing apparatus without a need for a separate rectifier, and another portion of the DC power may be converted into AC power serving as a supplement for local power supply. It is also possible to save energy required for cooling water discharged from a nuclear power generation system to the sea and for preheating a fuel cell through the heat exchange between cooling water discharged from the nuclear power generation system and cooling water introduced to the fuel cell. In addition, waste heat of the cooling water discharged from the fuel cell may be utilized for heating. Further, generating and recycling energy in the above-described manner inhibits $CO_2$ generation, thereby contributing to emission trading of $CO_2$.

Hereunder is provided the description of an experimental apparatus, which may be used in some embodiments of the present invention.

In order to measure the dynamic performance of closed or dead-end mode fuel cell, it is necessary to prepare the measuring instruments with rapid-response and controlling loop. The experimental setup may consist of the fuel supplying system, the solenoid valves for gas purge. The gases used for the reaction are hydrogen with the purity of 99.999% and the air. The air flow rate is kept twice larger than that is needed for the corresponding current by the mass flow controller. On the other hand, the hydrogen flow is controlled by the following two ways.

(1) In Open Mode Operation

The input hydrogen flow rate is controlled as in the cathode circuit, and the solenoid valve at the outlet of the anode channel is fully open.

(2) In Closed or Dead-End Operation

The hydrogen is supplied not by a mass flow controller, but by a pressure regulator to keep the pressure from 1.1 to 1.3 bar with the solenoid valve completely closed. In order to compare the output powers of the fuel cell under various conditions, a controller monitoring system was designed and implemented.

The front panel and block diagram may be provided by, for example, the LabView program, which helps implemented to monitor the pressure, applied frequency, the fuel cell performance and the power consumption of the pulsating generator as well as to control the external loader, gas temperature, and the fuel cell operation mode.

The front panel of the Labview program for controlling the cooling system may be set for operating in same temperature difference condition between inlet coolant and outlet coolant. The integrated monitoring/controlling system allowed accurate and reliable sampling and regulating of the parameters. The experiments performed in this study are classified into (1) Evaluating the performance of dead-end mode fuel cell by external loader (2) Measuring the concentration distribution of hydrogen by mass spectroscope (3) Visualization of the fuel cell.

While the present invention has been described with respect to the specific embodiments, it will be apparent to those skilled in the art that various changes and modifications may be made without departing from the spirit and scope of the invention as defined in the following claims.

What is claimed is:

1. A fuel cell system using waste hydrogen generated from a sea water electrolyzing apparatus, the fuel cell system comprising:
   a sea water electrolyzing apparatus carrying out electrolysis of sea water used as cooling water in a nuclear power generation system to produce a chlorine-containing material;
   a hydrogen conveying line linked to one side of the sea water electrolyzing apparatus to convey waste hydrogen generated during the electrolysis; and
   a fuel cell linked to the hydrogen conveying line to generate electricity by using the waste hydrogen supplied from the hydrogen conveying line as fuel,
   wherein the fuel cell system further comprises a waste hydrogen deionization or dechlorination unit, the waste hydrogen deionization or dechlorination unit is a coaxial channel having a core channel, a shell channel surrounding the core channel, and an intermediate membrane defining the core channel and the shell channel, and the waste hydrogen flows through the core channel, while water discharged from the fuel cell flows through the shell channel,
   wherein the fuel cell system further comprises a bubbler for deionization or dechlorination of waste hydrogen, the bubbler allows the gas passed from the coaxial channel to be bubbled in deionized water, while the gas is collected over the deionized water to be sent to a hydrogen inlet of the fuel cell, and the deionized water is exchanged periodically with fresh deionized water,
   wherein the fuel cell uses dehumidified hydrogen as fuel, and the fuel cell system is further provided with a hydrogen drying unit at an upstream of the hydrogen inlet to dry hydrogen introduced to the fuel cell.

2. The fuel cell system according to claim 1, wherein the intermediate membrane is wetted with water, and ions and chlorine contained in gases flowing through the core channel after being discharged from the sea water electrolyzing apparatus are collected at the wet intermediate membrane.

3. The fuel cell system according to claim 2, which further comprises a scrubber for deionization or dechlorination of waste hydrogen, the scrubber comprises activated carbon or iron oxide ($FeO_2$), and the gas collected over the deionized water is passed through the scrubber to be sent to a hydrogen inlet of the fuel cell.

4. The fuel cell system according to claim 3, wherein the fuel cell is a polymer electrolyte membrane fuel cell (PEMFC), the sea water electrolyzing apparatus is connected electrically to the fuel cell so that the sea water electrolyzing apparatus is operated by electricity generated from the fuel cell, and the hydrogen conveying line is provided with a hydrogen reservoir in which waste hydrogen is stored, and the fuel cell system further comprises a DC/AC converter converting DC voltage generated from the fuel cell into AC voltage.

5. The fuel cell system according to claim 4, which further comprises a heat exchanger carrying out heat exchange between first cooling water discharged from the nuclear power generation system and second cooling water introduced to the fuel cell, and further comprises a heating unit using the second cooling water discharged from the fuel cell as a heating source, wherein the heating unit is linked to the heat exchanger via a cooling water circulation line so that the second cooling water is circulated through the fuel cell, the heating unit and the heat exchanger.

* * * * *